Jan. 29, 1957  C. A. TOBIAS ET AL  2,779,876
RADIOACTIVITY-DISTRIBUTION DETECTOR
Filed March 3, 1953  2 Sheets-Sheet 1

INVENTORS
CORNELIUS A. TOBIAS
HAL O. ANGER
BY

ATTORNEY

Jan. 29, 1957 C. A. TOBIAS ET AL 2,779,876
RADIOACTIVITY-DISTRIBUTION DETECTOR
Filed March 3, 1953 2 Sheets-Sheet 2

INVENTORS
CORNELIUS A. TOBIAS
HAL O. ANGER
BY
Roland A. Anderson
ATTORNEY

United States Patent Office 2,779,876
Patented Jan. 29, 1957

2,779,876

RADIOACTIVITY-DISTRIBUTION DETECTOR

Cornelius A. Tobias, Walnut Creek, and Hal O. Anger, Berkeley, Calif., assignors to the United States of America as represented by the United States Atomic Energy Commission Application March 3, 1953, Serial No. 340,069

5 Claims. (Cl. 250—83.3)

The present invention relates to radiation detectors and more particularly to a detector which converts radiation into visible light and provides an image of the distribution of radiation over a relatively large surface.

Numerous types of radiation survey meters have become known in the art, but such instruments are limited in their use in that only small areas may be surveyed from any one position of the detector element. The limitation mentioned results from the fact that the detector unit or element usually comprises a single (and relatively fragile) tube which must be manually moved over the surface being surveyed in order to locate the position of radioactive contamination or to determine the distribution of radiation over the area. Such procedure is necessarily laborious and time consuming even for relatively small areas.

The use of films having various degrees of sensitivity for the making of radioautographs is well known in the art; however, even the most sensitive of film requires a long exposure time. The importance of radioautographs has increased with the increased use of radioactive tracers in the field of medicine, but the required time of exposure reduces the usefulness which could be realized from the radioautographs.

The present invention is useful both as an instrument for surveying radioactive areas and for making radioautographs without the disadvantages stated in the foregoing. There is provided a housing similar to a pinhole camera having a plurality of small gamma counters which individually result in the energization of corresponding neon bulbs upon the incidence of gamma radiation. Such neon bulbs are arranged in a pattern similar to that of the counters so that an image of the radioactive area is formed.

It is therefore an object of the present invention to provide a new and improved radiation detector.

Another object of the invention is to provide a radiation detector which is useful as a survey meter and as a device for taking radioautographs.

Still another object of the invention is to provide a radiation detector which forms a visual image of the radioactive area at the time of exposure.

A further object of the invention is to provide a radiation detector for surveying a substantially large area at one time.

A still further object of the invention is to provide a rapid and highly sensitive radiation detecting device for taking radioautographs.

Other objects and advantages of the present invention will be apparent in the following description and claims considered together with the accompanying drawing, in which:

Figure 1:
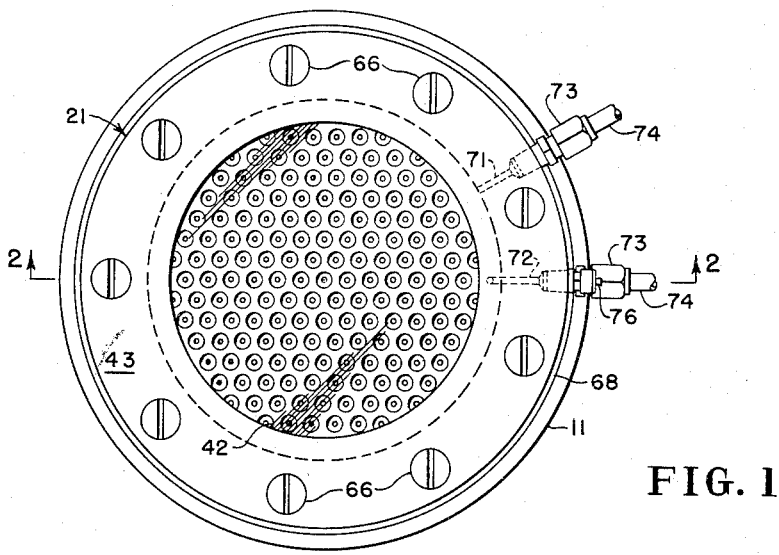
Figure 1 is a plan view of the invention.
Figure 2:
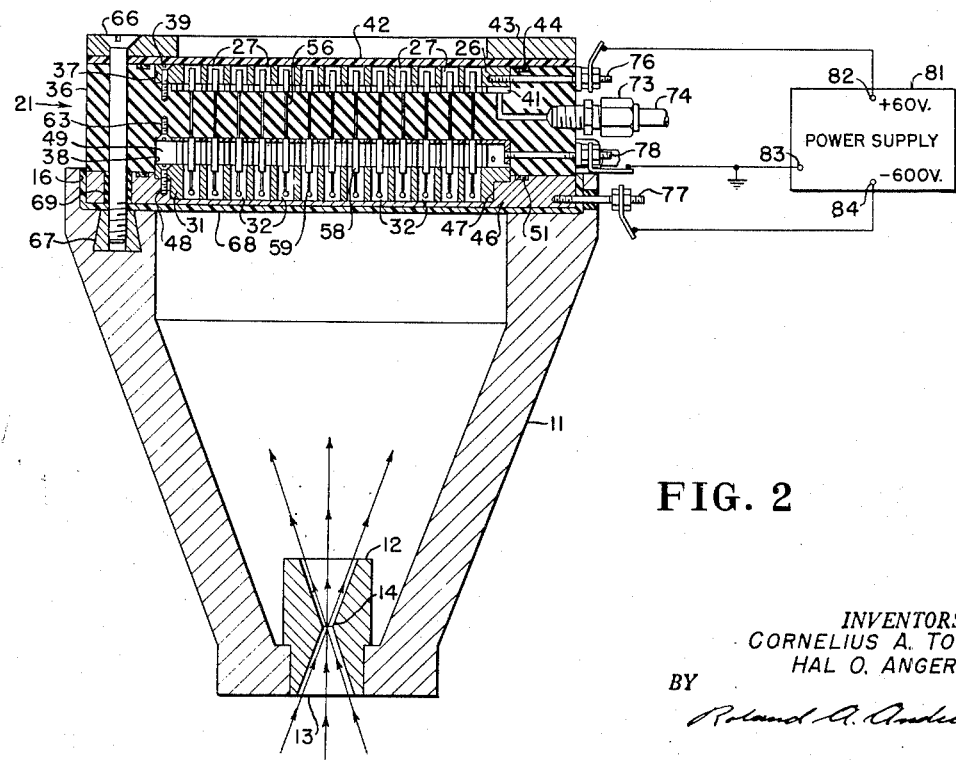
Figure 2 is a sectional view of the invention taken along the line 2—2 of Fig. 1.

Referring to the drawing in detail, Fig. 2 in particular, there is provided a generally conical housing 11 of a material which is impervious to gamma radiation. Suitably mounted at the vertex of the housing 11 is an apertured member 12 having an axial opening 13 with a centrally located restriction 14 such that the walls of the opening diverge at either side from the restriction. The base or enlarged portion of the housing 11 is open with a circular rabbet 16 provided along the inner edge thereof to receive a radiation detecting and indicating component 21.

The detecting and indicating component 21 comprises, in general, a plurality of gamma counters, a similar plurality of neon lamps disposed in alignment with such counters, a nonconducting separator positioned therebetween with a plurality of conductors extended therethrough so as to interconnect each of the aligned counter and lamp combinations, and suitable means for forming a unitary body of such elements. In detail, there is provided a first conducting plate 26 which is cylindrical in form and has a diameter substantially equal to the inside diameter of the enlarged end of the housing 11. A plurality of small cylindrical openings 27 pierce the plate 26 in such a manner that a fine honeycomb-type of structure is provided with the walls between adjacent openings as thin as practicable. A second conducting plate 31 having substantially the same diameter as the first plate 26, but a greater thickness, is pierced in a similar manner with a like plurality of openings 32. Thus, when the two plates 26 and 31 are placed face-to-face the openings 27 and 32 may be aligned so as to be continuous.

Figure 3:
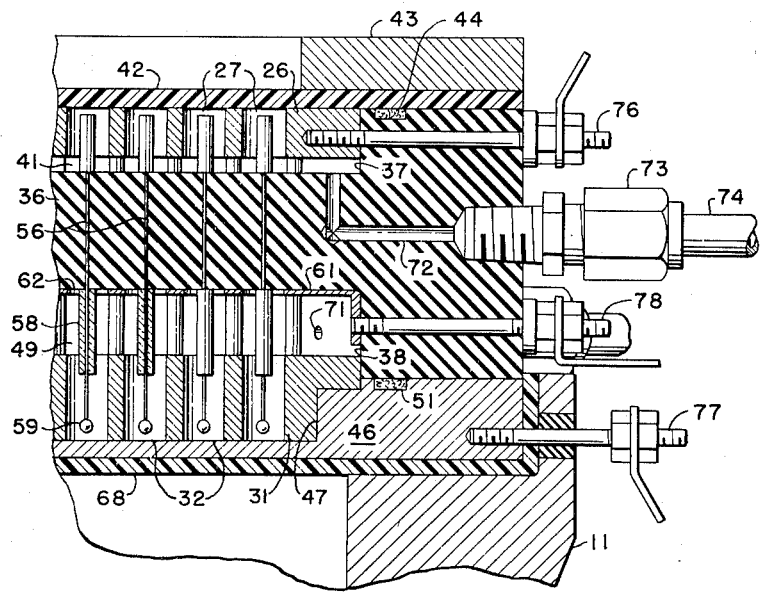
Figure 3 is an enlarged fractional view of a portion of Fig. 2.

A cylindrical separator 36 of nonconducting material, having an outside diameter substantially the same as the rabbet 16 of the housing 11, is provided to be disposed between the two plates 26 and 31. The upper and lower faces of the separator 36 are provided with circular recessed portions 37 and 38, respectively (see Fig. 3). The upper recessed portion 37 of the separator 36 is suitably adapted to mount the first plate 26, as by means of screws 39, in a flush manner with a chamber 41 formed therebetween. To permit observation of the openings 27 in the first plate 26 a transparent and polished window 42 is mounted over the plate by means of a retaining ring 43. For the purposes of the invention it is necessary that the chamber 41 be airtight, and to accomplish such requirement a circular gasket 44 is disposed between the separator 36 and the window 42.

An end plate 46 of conducting material, such as stainless steel, is provided with a centrally disposed cylindrical cavity 47 to receive the second conducting plate 31 in such a manner that a portion thereof extends above the face of the end plate. Preferably the conducting plate 31 is secured to the end plate 46 in a suitable manner, such as by screws 48. Thus, when the end plate 46 is disposed adjacent the separator 36, in the normal position of assembly, the extended portion of the conducting plate 31 extends into the other recessed portion 38 of the separator to form a second chamber 49 therebetween. A circular gasket 51 is disposed between the end plate 46 and the separator 36 to render the chamber 49 airtight.

In accordance with the present invention, it is necessary to align the plurality of openings 27 in the first conducting plate 26 with those openings 32 in the second conducting plate 31. In such position a plurality of wires 56 are extended through the separator 36, one along the center line of each pair of aligned openings 26 and 32, so as to serve as central electrodes. At one end the wires 56 extend into, and substantially the length of, the openings 27 in the plate 26 (see Fig. 3). Preferably the portions of the wires 56 which extend within the openings 27 are enlarged. The other end of the wires 56 extend through the chamber 49 and into the openings 32 of the plate 31 for substantially the length thereof. Sleeves 58 of insulating material, such as polystyrene, are suitably affixed about the wires 56 and have a length substantially equal to the depth of the chamber 49, so that the combination of the enlarged portion and the sleeves 58 maintain the proper position of the wires with respect to the separator 36 at all times. To prevent sparkling between the lowermost end of the wires 56 and the end plate 46, insulating beads 59, of a material such a polystyrene, are provided on the ends of the wires. The reason for the latter requirement will become more apparent hereinafter. There is also provided a thin conducting plate 61 having a plurality of apertures 62, which match the openings 27 and 32, suitably mounted, as by screws 63, to the separator 36 within the chamber 49.

To retain the elements of the detecting and indicating component 21 in a unitary form a plurality of screws 66 are extended through the retaining ring 43, the window 42, the separator 36, and the end plate 46 to threadably engage inserts 67 of an insulating material countersunk in the rabbet 16 of the housing 11. A thin layer 68 of insulating material is disposed within the rabbet 16 between the end plate 46 and the housing 11, so that the latter will be free of a potential impressed on the former. The screws 66 are provided with cylindrical insulators 69 which extend through the end plate 46 to prevent transference of the potential of such end plate to the retaining ring 43.

Passages 71 and 72 are provided through the separator 36 such that one communicates with the chamber 41 and the other with the chamber 49. Each of the passages 71 and 72 is provided with a fitting 73 to which tubes 74 may be attached. By connecting the tubes 74 to a vacuum pump (not shown) and, by a suitable valve, to a source of gas (not shown), the chambers 41 and 49 may be evacuated and then filled with a gas at a desired pressure. Since it is desired to operate the plurality of openings 32 as gamma ray detectors, a monatomic gas such as argon is introduced at a desired pressure into the chamber 49. The filling gas for the chamber 41 is selected so that a discharge between the wire 56 and walls of the openings 27 results in emission of visible light and for such result neon is preferred. An electrode 76 is suitably extended through the separator 36 to threadably engage the first conducting plate 26, and another electrode 77 is suitably extended through the housing 11 and insulating layer 68 to threadably engage the end plate 46. A third electrode 78 is suitably extended through the separator 36 and connected to the guard ring 61. A conventional power supply 81 is provided having a positive terminal 82 connected to the first electrode 76, a grounded terminal 83 connected to the third electrode 78, and a negative terminal 84 connected to the second electrode 77. It has been found that by suitably dimensioning the elements of the indicating and detecting component 21 and by suitable selection of gas pressures in the chambers 41 and 49 that the required voltages of the power supply 81 are 60 volts positive at the first terminal 82 to 600 volts negative at the third terminal 84. With such impressed potentials there is approximately a distribution of 60 volts across the gap between the wires 56 and the walls of the openings 27 and of 600 volts across the gap between the wires 56 and the walls of the openings 32.

With the device assembled in the manner set forth in the preceding paragraphs and with the power supply 81 suitably energized, the device is ready for use as a radiation survey instrument to detect gamma rays. It will be readily apparent that the present invention is similar in appearance to a conventional pinhole camera and that by pointing the apertured member 12 toward an area of suspected contamination some of the gamma rays from such contamination will enter the housing 11 through the aperture. The entering gamma rays will have the pattern of the source thereof and will continue through the housing 11 to penetrate into the openings 32 of the second conducting plate 31. As stated previously each of the openings 32 communicates with the chamber 49 and so is filled with argon gas so that each opening serves as a gamma ray detector. The principles of operation of gamma ray detectors are well known in the art and will not be discussed in detail, except to state that when a gamma ray passes through one of the openings 32 secondary ionization occurs. Because of the applied potentials the free electrons resulting from such secondary ionization are collected by the wire 56 to lower the potential thereof with respect to the walls of the corresponding opening 27 in the first conducting plate 26. Now with suitable dimensioning of the opening 27 and of the centrally disposed wire 56, the change of potential therebetween results in a flow of electrons and thereby ionization of the neon gas. The latter result, as is well known, is accompanied by the emission of visible light which may be viewed through the window 42.

From the foregoing, it will be readily apparent that a visible image will be formed by the number of openings 27 in which a discharge takes place, corresponding to the radiation given off by the area surveyed. Also, the points of greater gamma ray emission will be visible as points of greater light intensity because of more frequent discharges in the respective openings 27.

Figure 4:
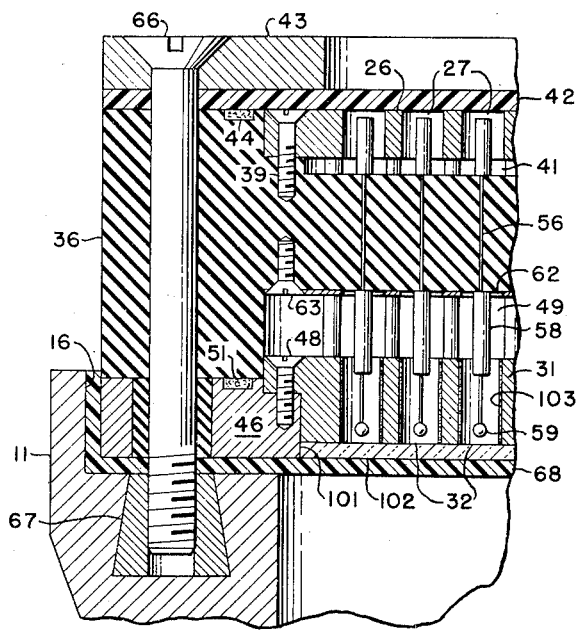
Figure 4 is a fractional view of a second embodiment of the invention.

A second embodiment of the invention (see Fig. 4) is substantially the same as the foregoing, but with minor changes to permit a second mode of gamma ray detection. It is necessary that the insulating sheet 68 and separator 36 be impervious to visible light. The end plate 46 is modified to have a circular opening 101, which underlies the entire area of the openings 32 in the plate 31 and which suitably retains a circular member 102 of a material which forms light scintillations as gamma rays lose energy in passing therethrough. Another modification is made in that the walls of the openings 32 in the plate 31 are coated with a photo-sensitive material 103 such as found on the cathodes of conventional photocells or cesium oxide. The chamber 49 should be evacuated, but gas admitted thereafter. An adjustment of the voltage of the negative terminal 84 of the power supply 81 may also be desirable for optimum operating conditions.

The operation and results of such embodiment of the invention are similar to that set forth for the first-described embodiment. Thus, gamma radiation reaching the scintillation material 102 causes light flashes to fall on the photosensitive coating 103 of the walls of the openings 32 adjacent to the points of incidence which releases free electrons therefrom. Such free electrons are then collected by the wires 56 thereby altering the potential difference between the wires and walls of the openings 27 so that a discharge occurs therebetween and visible light is emitted. By observing the light pattern of the openings 27 as seen through the window 42 the location of radioactivity in the area being surveyed may be determined.

Thus, there has been described in detail two embodiments of a radiation detector which produce a visual image of the distribution of radioactive contamination in accordance with the objects of the invention as set forth in the foregoing. If a permanent record of such distribution is desired, as in the taking of a radioautograph, a conventional film holder may be suitably attached over the neon bulbs so that the light therefrom will expose the film. It will be readily apparent that the dimensions of the housing 11 may be varied as well as the number of openings 32 and 27 to change the focal length and resolution, respectively.

It is to be noted that the present invention, in addition to uses in tracer medicine, as stated previously, is useful to determine the distribution of contaminations after an atom bomb blast, in radiological warfare, and after accidents in reactors and laboratories. Such latter usefulness may be increased by mounting the invention on a helicopter or on a platform supported above a ground vehicle.

Along with the foregoing two embodiments of the invention, it will be realized that the art of television may be combined therewith. That is, a television camera may be mounted with respect to the devices described so that the pattern displayed is scanned and transmitted by a conventional transmitter to be received and displayed appropriately at a remote position. Within the scope of the invention there may be provided a pinhole camera which forms an image upon a large cylindrical sodium iodide crystal which, in turn, is scanned directly by an image-orthicon for television transmission as stated previously.

While the salient features of the present invention have been described in detail with respect to two embodiments it will, of course, be apparent that numerous modifications may be made within the spirit and scope of the invention and it is therefore not desired to limit the invention to the exact details shown except insofar as they may be defined in the following claims.

What is claimed is:

1. In a radiation instrument, the combination comprising a housing having a pinhole opening, means for supporting a layer of scintillation material along a plane transverse to the center-line of said opening, a plurality of photoelectric cells disposed adjacent said material, a similar plurality of indicating lamps mounted in an array similar to the array of said photocells, means connected between individual photocells and corresponding lamps for providing a plurality of series circuits, and power supply means connected to said series circuits for impressing operating potentials.

2. In a radiation instrument, the combination comprising a housing having a pinhole aperture, an end plate positioned along a plane transverse to the center-line of said aperture and having a central opening, a layer of scintillation material disposed within said central opening, a conducting plate mounted within said central opening against said scintillation material and having a plurality of cylindrical openings disposed parallel to said center-line, a coating of photosensitive material disposed on the walls of said cylindrical openings, an insulating block mounted on said end plate and providing an airtight chamber with respect to said conducting plate, means communicating with said chamber to provide control of the atmosphere therein, each of said openings having a central conductor axially extended therein, a plurality of indicating lamps mounted in an array similar to said cylindrical openings, means connecting each conductor to a corresponding lamp to provide a plurality of series circuits, and power supply means connected to said conducting plate and said lamps for impressing operating potentials.

3. The combination of claim 2 wherein said plurality of indicating lamps is mounted on said insulating block to provide a unitary device.

4. The combination of claim 2 characterized by a second conducting plate mounted on said insulating block in air-tight relation and providing a second chamber therebetween, said second conducting plate having a plurality of cylindrical openings aligned with the openings of said first-mentioned conducting plate, said central conductor extended through said insulating block into the respective openings of said second conducting plate, a sheet of glass mounted on said second conducting plate, and said power supply means connected to each of said conducting plates.

5. The combination of claim 4 wherein means communicates with the chamber between said insulating block and said second conducting plate for introduction of neon.

References Cited in the file of this patent

UNITED STATES PATENTS

| | | |
|---|---|---|
| 2,424,976 | Golay et al. | Aug. 5, 1947 |
| 2,457,555 | Haworth | Dec. 28, 1948 |

OTHER REFERENCES

Multichannel Collimators for Gamma-Ray Scanning With Scintillation Counters by Newell et al., published in Nucleonics July 1952, pages 36–40.